No. 640,584. Patented Jan. 2, 1900.
R. NAISH.
CALCULATING DEVICE.
(Application filed Nov. 12, 1897.)

(No Model.) 2 Sheets—Sheet 1.

WITNESSES:
O. E. Winge.
M. F. Boyle.

INVENTOR
Redmund Naish
BY
Thomas Drew Stetson
ATTORNEY

No. 640,584. Patented Jan. 2, 1900.
R. NAISH.
CALCULATING DEVICE.
(Application filed Nov. 12, 1897.)
(No Model.) 2 Sheets—Sheet 2.

Witnesses. Inventor,
O. C. Wingo. Redmund Naish
M. F. Boyle. By Thomas Drew Stetson
Attorney

UNITED STATES PATENT OFFICE.

REDMUND NAISH, OF DUBLIN, IRELAND.

CALCULATING DEVICE.

SPECIFICATION forming part of Letters Patent No. 640,584, dated January 2, 1900.

Application filed November 12, 1897. Serial No. 658,258. (No model.)

*To all whom it may concern:*

Be it known that I, REDMUND NAISH, a subject of the Queen of Great Britain and Ireland, and a resident of Blackrock, Dublin, Ireland, have invented a certain new and useful Calculating Device, (for which I have obtained provisional protection in the United Kingdom of Great Britain and Ireland, dated May 19, 1897, and numbered 12,347;) and I do hereby declare that the following is a full, clear, and exact description of the invention, which will enable others skilled in the art to which it appertains to make and use the same.

The object of this invention is to accomplish by mechanical means the ascertainment of percentages and other proportions and numerical results with equal accuracy and rapidity and greater simplicity and economy than by mechanical contrivances hitherto in use, so far as I am aware, and as an educational adjunct to elicit some of the properties of logarithms by graphic representation and a simple appliance adapted for the tangible determination of position, involving an illustration of geometrical and logarithmic theory combined, calculated to stimulate the interest of students.

Figure 1:
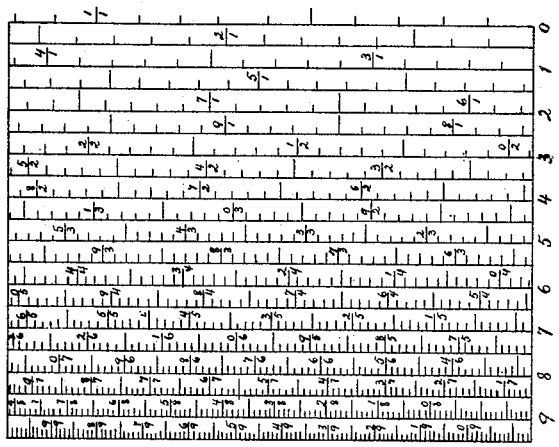
Figure 2:
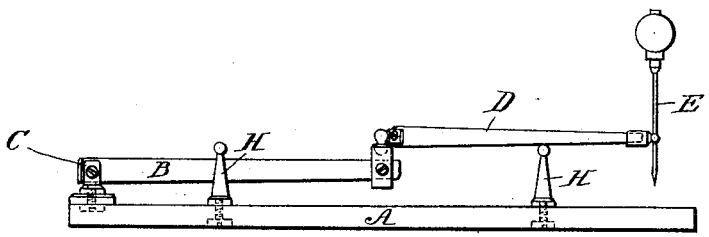
Figure 3:
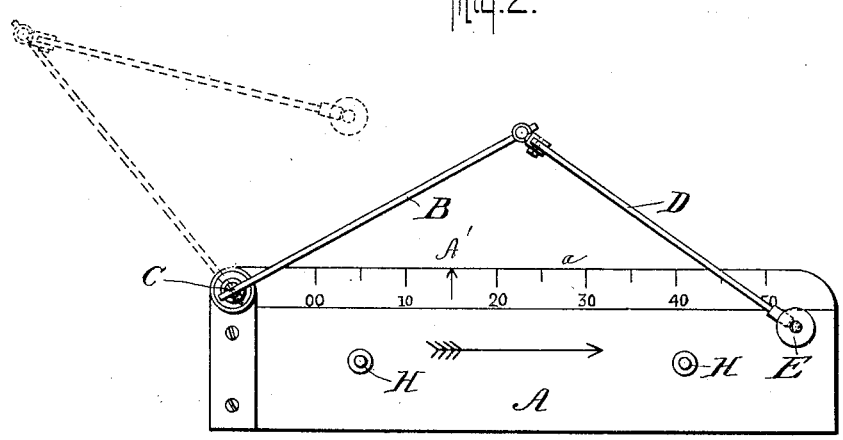
Figure 4:
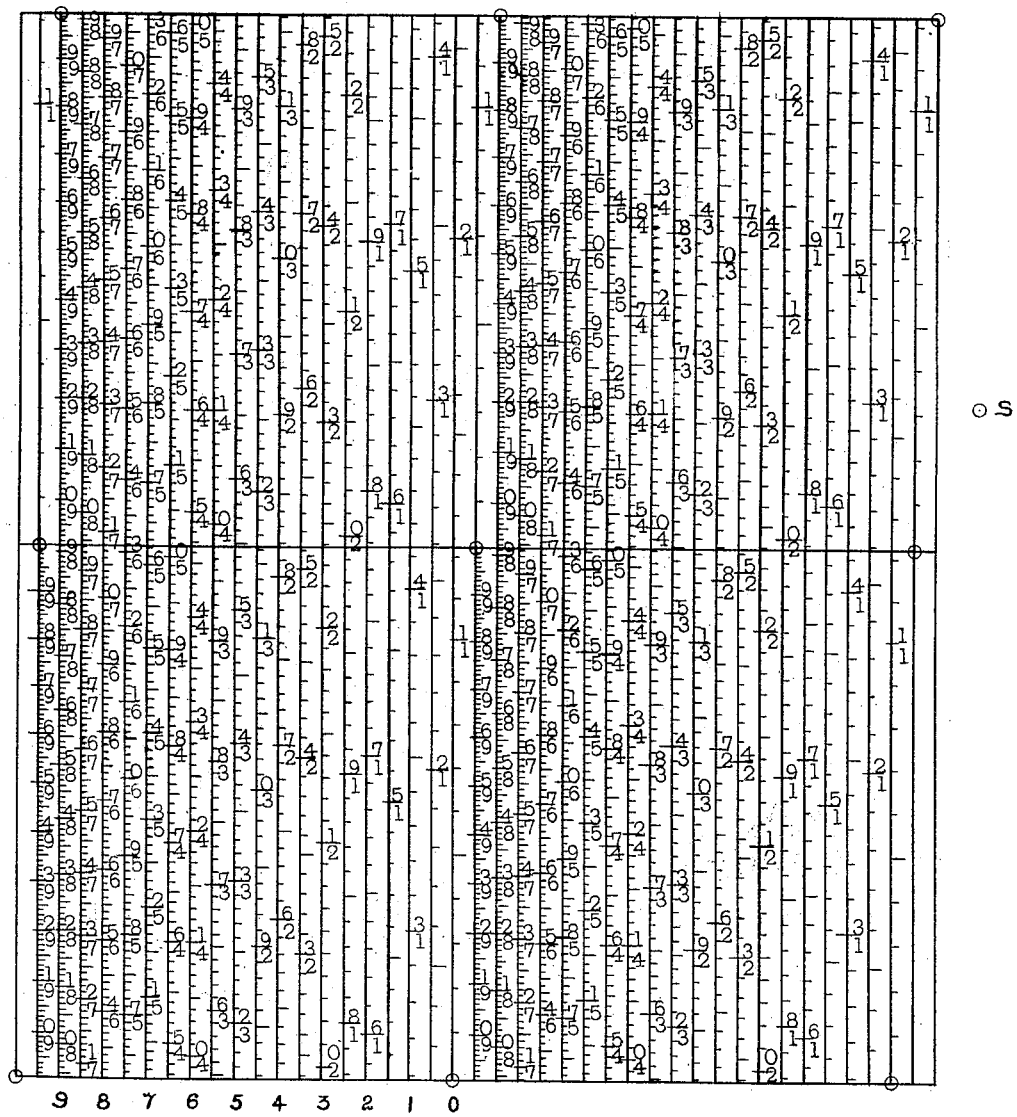

In the accompanying drawings, forming a part of this specification, Figure 1 is a diagram of a single scale adapted to be used in carrying out my invention. Fig. 2 is a longitudinal side view of my improved instrument to be used therewith, and Fig. 3 is a plan view of the same. The dotted lines show one position of the index-pointer and the double arm when the instrument is in use. Fig. 4 shows a compound scale or combined table containing four single scales peculiarly applied together. In this manner any number of single scales or parts of single scales may be joined together.

Similar letters of reference indicate like parts in all the figures where they appear.

In carrying out my invention I employ a logarithmic scale similar to that used in the well-known and long-approved slide-rule running from "1" to "10." I will use the ordinary term "radius" in the same technical sense as in the slide-rule to designate the entire length of the peculiarly-graduated space from "1" to "10" or from "10" to "100," and so on.

My invention affords a means superior to any before known to me of obtaining in a small space a long radius with its obvious advantage of increased accuracy. I employ such radius and divide it into a number of equal parts laid on a flat surface in equidistant parallel lines, the first line uppermost. This forms what I will term my "table."

The radius in the ordinary pocket slide-rule is five inches. The radius to be thus divided in my table may vary according to the degree of accuracy required. For ordinary purposes a radius of, say, eighty inches may be adopted, affording results very distinct and accurate, the errors not exceeding one in a thousand.

There is no necessary restriction as to the number of parts into which the radius shall be divided. Ten is a convenient number of lines and after that twenty. As with the latter number the tabulation takes a more compact shape and suits the application of the instrument, twenty is the number adopted in the diagram, Fig. 1, which shows what I term my "simple table." I thus form four simple tables, all alike, each simple table containing a radius divided into twenty equal parts, and apply them together in two tiers, two in each tier. They are set a little disjointed vertically. The lines brought into junction and continuity show also a continuity of the series of graduations and numbers, the second line of the scale on the left beginning at the number or fraction thereof where the first line of the scale on the right ends, the third beginning where the second line of the scale ends, and so on.

The direction of the sequence of the numbers from right to left is preferable, but is not essential. The opposite direction might be fixed upon instead; but whichever is adopted that should be maintained throughout all the lines. Convenience is served by expressing only a portion of every tenth of the numbers. The digits may, furthermore, be set sidewise—*e. g.*, "37" may be engraved thus: "⸕ ⸦."

It will be understood that, as with the ordinary long-approved slide-rule, the answers give numbers without indicating the decimal point and that the latter must be determined by other means.

The instrument to be used with my table I propose to designate the "position-finder." It consists of a rectangular plate A, of wood or other suitable material, one edge $a$ of which is chamfered and is marked by a certain fixed point A', which for convenience is designated the "polar point." This polar point may be near the mid-length of the edge $a$ and should be clearly and sharply indicated. From a swivel-bracket C swings horizontally an arm B, which carries by means of a ball-and-socket joint, offering gentle friction, a branch arm D, the extremity of which is provided with a pin or pointer E, which for convenience is designated the "vectorial point." Handles H H are fixed on the upper side of the plate A for facilitating the movement of the instrument.

The manner of using my invention is as follows: It is understood that whenever the position-finder is applied to the scale the chamfered edge of the former is to lie along some line of the latter. The first and last point of each simple table may be designated a "power-point."

To find what percentage of nine hundred and fifty-two is six hundred and forty-eight, proceed as follows: Apply the position-finder to the scale so that the polar point shall be at the power-point which commences the first table—that is to say, at the upper right-hand corner of the upper right-hand table—and by turning the arms B and D adjust the vectorial to "952." Then carefully lift up the instrument, the friction holding the arms set, and reapply it with the vectorial at "648," whereupon the polar point will automatically indicate "68.06+," which is the per cent. required.

The instrument may be applied in other ways; but this is especially convenient when several numbers are to be percentaged to the same base, as the same adjustment will then serve for all cases.

To multiply three hundred and forty-one by ninety-seven proceed as follows: Apply the position-finder, as before, to the polar point at the top, right, and with the edge $a$ coinciding accurately with the top line of the upper right table, and then turn the arms B D to adjust the vectorial to "341." Then carefully lift the position-finder and place it with its polar point at "97." Taking care to make the edges coincide with the line in which "97" occurs, the vectorial point will be carried beyond the bounds of the first—the upper right-hand—table and be presented over the lower left-hand table. On that table thus combined it will now indicate a little more than "33." A little calculation will show that the "33" indicates thousands. The answer found by this instrument is a little above thirty-three thousand. My instrument, in common with all other forms of slide-rules, gives only approximations. This is the approximation attained instantly by the instrument to the "33077," which by an elaborate calculation with figures in the ordinary way will be the exact answer.

It is believed that these examples are sufficient to illustrate the varied usefulness of the invention.

I claim as my invention—

1. The table described comprising two or more logarithmic scales, each divided into equal parts arranged parallel to form a table, the right-hand ends of the lines in one of the simple tables matched against the last previous left-hand ends of the lines in another so as to serve in continuity therewith, as herein specified.

2. The table described comprising two or more logarithmic scales, each divided into equal parts arranged parallel to form a table, the right-hand ends of the lines in one of the simple tables matched against the last previous left-hand ends of the lines in another so as to serve in continuity therewith, in combination with similar tables applied below and so as to form a duplication of the simple tables both laterally and downward, all substantially as herein specified.

3. A position-finder comprising a plate A, having an edge $a$ carrying a plainly-marked point A', a swiveling device C, a stylus or index-pointer E and a variable connection between said post and said pointer, adapted to serve substantially as herein specified.

4. The instrument described comprising a substantial plate or base A, having an accurately-finished edge $a$, having a point A' finely marked thereon, in combination with a turning device C, the arms B and D connected together and to the turning device C by stiffly-flexible joints, and a pointer E carried on the second arm, adapted to serve substantially as herein specified.

Dated this 28th day of October, 1897.

REDMUND NAISH.

Witnesses:
ANGELO FAHIE,
JOSEPH WALSH.